United States Patent
Duval et al.

(10) Patent No.: US 11,736,444 B2
(45) Date of Patent: Aug. 22, 2023

(54) CLOUD-BASED PRIVATE AREA NETWORK

(71) Applicant: NAGRASTAR LLC, Englewood, CO (US)

(72) Inventors: Gregory Duval, Englewood, CO (US); Benjamin Brian Ellis, Denver, CO (US)

(73) Assignee: NAGRASTAR LLC, Englewood, CO (US)

( * ) Notice: Subject to any disclaimer, the term of this patent is extended or adjusted under 35 U.S.C. 154(b) by 0 days.

(21) Appl. No.: 16/577,668

(22) Filed: Sep. 20, 2019

(65) Prior Publication Data

US 2020/0099661 A1    Mar. 26, 2020

Related U.S. Application Data

(60) Provisional application No. 62/734,504, filed on Sep. 21, 2018.

(51) Int. Cl.
*H04L 9/40*      (2022.01)
*H04L 12/28*     (2006.01)
(Continued)

(52) U.S. Cl.
CPC ...... *H04L 63/0272* (2013.01); *H04L 12/2834* (2013.01); *H04L 12/4641* (2013.01);
(Continued)

(58) Field of Classification Search
CPC . H04L 12/2834; H04L 12/4641; H04L 12/66; H04L 61/2015; H04L 63/0272;
(Continued)

(56) References Cited

U.S. PATENT DOCUMENTS 10,116,739 B2 * 10/2018 Kuo ....................... H04L 67/104
2013/0094451 A1 * 4/2013 Pavlovski ............. H04L 45/745
370/329

(Continued)

FOREIGN PATENT DOCUMENTS

EP       2648391 A1      10/2013
WO    2009/155574 A1    12/2009

OTHER PUBLICATIONS

Mechtri et al., "Inter and Intra Cloud Networking Gateway as a Service", IEEE 2nd International Conference on Cloud Computing (CloudNet), 2013. (Year: 2013).*

(Continued)

*Primary Examiner* — Saad A. Waqas

(57) ABSTRACT

Examples of the present disclosure describe systems and methods for implementing a cloud-based private area network. In aspects, various customer devices may be connected to a cloud-based carrier or wireless carrier. The carrier may use identification information associated with each customer device to group devices by, for example, customer account. For each customer account, the carrier may create and/or assign a customer-specific gateway. The customer gateway may enable devices identified as associated with an account to detect and communicate securely with each other over a cloud-based private area network. Additionally, each customer gateway may provide several functions typically found in private or home gateways and local area networks (LANs) to the devices associated with an account.

20 Claims, 7 Drawing Sheets

(51) Int. Cl.
  *H04L 12/46* (2006.01)
  *H04L 12/66* (2006.01)
  *H04W 88/16* (2009.01)
  *H04W 12/086* (2021.01)
  *H04L 61/5014* (2022.01)

(52) U.S. Cl.
  CPC .............. *H04L 12/66* (2013.01); *H04L 63/08* (2013.01); *H04W 12/086* (2021.01); *H04W 88/16* (2013.01); *H04L 61/5014* (2022.05)

(58) Field of Classification Search
  CPC .. H04L 63/08; H04W 12/06; H04W 12/0806; H04W 88/16
  See application file for complete search history.

(56) References Cited

U.S. PATENT DOCUMENTS

2016/0352623 A1* 12/2016 Jayabalan ............. H04L 45/026
2017/0078875 A1*  3/2017 Muhanna .............. H04L 9/0827
2017/0346686 A1* 11/2017 Mudigonda ......... H04L 41/0813
2018/0373568 A1* 12/2018 Frost ..................... G06F 9/4881

OTHER PUBLICATIONS

International Patent Application No. PCT/US2019/052402, International Search Report and Written Opinion dated Dec. 17, 2019, 9 pages.

\* cited by examiner

CLOUD-BASED PRIVATE AREA NETWORK

CROSS-REFERENCE TO RELATED APPLICATIONS

This application claims the benefit of U.S. Provisional Application Ser. No. 62/734,504, filed Sep. 21, 2019, entitled "Cloud-Based Private Area Network," which application is incorporated herein by reference in its entirety.

BACKGROUND

In a public cell network, end-user devices are given public IP addresses. These public IP addresses are assigned to the devices connecting to the public cell network randomly and change periodically. Although the devices on the public cell network can detect each other, the public cell network does not provides a mechanism for two devices to determine that they are in the same household or on the same account, or mechanism to provide function typically found in private or home gateways. As a result, devices on the public cell network must adopt a strict security policy that does not allow the devices to trust each other.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods for implementing a cloud-based private area network. In aspects, various customer devices may be connected to a cloud-based carrier or wireless carrier. The carrier may use identification information associated with each customer device to group devices by, for example, customer account. For each customer account, the carrier may create and/or assign a customer-specific gateway. The customer gateway may enable devices identified as associated with an account to detect, trust, and communicate securely with each other over a cloud-based private area network provided by the carrier. Additionally, each customer gateway may provide several functions typically found in private or home gateways and local area networks (LANs) to the devices associated with an account.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
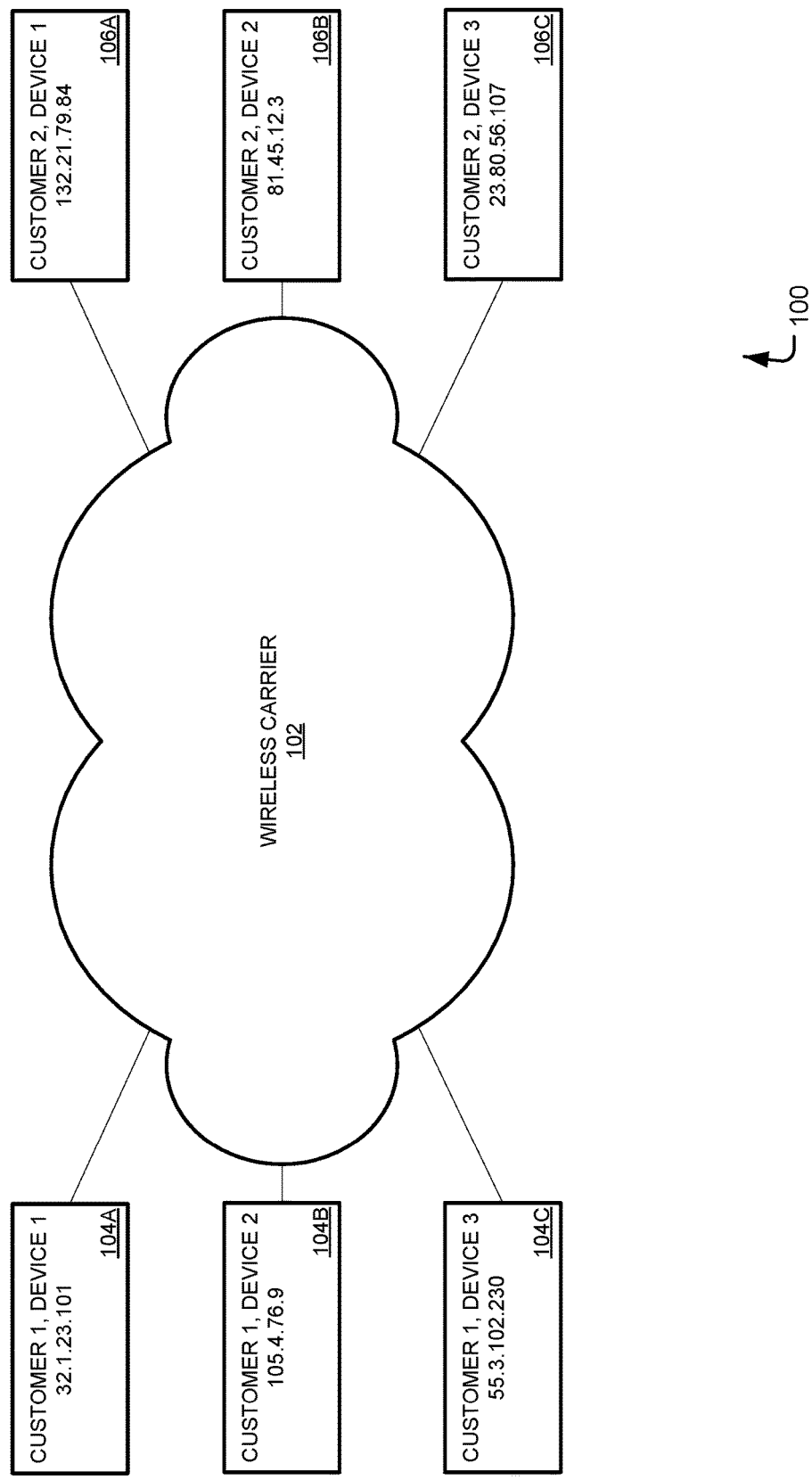
FIG. 1 illustrates an overview of a prior art network operator system.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Many users utilize private local-area networks (LANs) to connect devices located in a limited area, such as a residence or an office building. LANs generally incorporate private gateways that enable devices connected to the LAN to easily discover and communicate with each other. In many cases, the private gateways may determine or store information indicating the devices associated with the user's account(s). When the determined devices are detected to be connected to the LAN, the devices are assigned private internet protocol (IP) addresses that may be allocated on the same subnet. The private gateways ensure a particular level of trust for each device connected to the LAN and/or for each device associated with a particular user account. The private gateways also provide various functionalities for the connected devices, such as network address translation (NAT) and port forwarding. In contrast, public wide area networks (WANs), such as cellular "cell" networks, connect devices located in a limited area as well as devices that are located remotely from each other. In a WAN, devices are often randomly assigned public IP addresses that change periodically. Although the devices on the WAN can detect each other, the devices are unable to determine that they are associated with the same user, household, or user account. As a result, the devices must adopt strict security policies that do not allow connected devices associated by, for example, user account or household to trust or freely access each other. Moreover, the WAN is unable to provide much of the functionality found in private gateways.

With the above-described shortcomings of conventional WANs in mind, the present disclosure describes systems and methods for implementing a cloud-based private area network. In aspects, various customer devices may be connected to a cloud-based carrier or wireless carrier. The carrier may incorporate one or more WANs and provide access to attributes of communication service providers. The carrier may further incorporate or have access to information relating to one or more user accounts. Such information may include, for example, user identification information, user account names, single sign-on (SSO) credentials, user contact information, device identification information, device configuration information, network usage statistics, and user behavioral data. The carrier may use the information to identify or generate associations between one or more devices detected by a WAN. In examples, the associations may indicate devices related to the same user(s) or user account(s). The carrier may arrange devices indicated as associated into one or more logical groups, or otherwise provide an indication of the associations between one or more devices, users, and/or accounts.

In some aspects, the carrier may provide, or make accessible, one or more customer gateways via the WAN. In examples, the customer gateway may be physical and/or logical devices. Each customer gateway may be associated with, or assigned to, a group of devices indicated as associated. The customer gateway may enable the devices to discover, trust, and securely communicate with each other, and may provide functionality typically found in private, home gateways. For example, the customer gateway may provide dynamic host configuration protocol (DHCP) assignment of IP addresses, network address translation (NAT), domain name system (DNS) functions, port forwarding and/or blocking, firewall functions, access policy control, IP address and media access control (MAC) address binding, broadcast message delivery, network and device usage statistics, and an interface for configuring the customer gateway and/or interfacing with a group of devices.

Accordingly, the present disclosure provides a plurality of technical benefits including but not limited to: generating and maintaining user- or account-specific cloud-based gateways in WAN environments; enabling cloud-based gateways to provide functionality provided by a home or private gateway; using a WAN to identify and logically group devices associated or belonging to the same user or account; enabling devices located remotely from each other to detect and communicate securely with each other over a WAN; and improving the security of communications transmitted over WANs, among other examples.

FIG. 1 illustrates an example of a prior art network operator system. System 100 comprises wireless carrier 102, customer devices 104A, 104B, and 104C, and customer devices 106A, 106B, and 106C. Customer devices 104A, 104B, and 104C represent devices associated with a first customer (i.e. CUSTOMER 1) or first customer account, and customer devices 106A, 106B, and 106C represent devices associated with a second customer (i.e. CUSTOMER 2) or a second customer account. In system 100, each customer device connects to wireless carrier 102 independently and is assigned a public IP address that is unrelated to the IP addresses of the other connected devices. When connected to wireless carrier 102, the customer devices are individually unaware of other devices that are on the same user account or other devices related to the same user. Moreover, wireless carrier 102 provides no mechanism for sending or broadcasting messages from one device on a customer account (or relating to a specific user) to other devices on the same customer account (or relating to the specific user). Additionally, wireless carrier 102 is not configured to provide the functionality typically incorporated into private/home gateways or LAN environments (e.g., port forwarding and/or blocking, firewall functions, access policy control, etc.).

Figure 2:
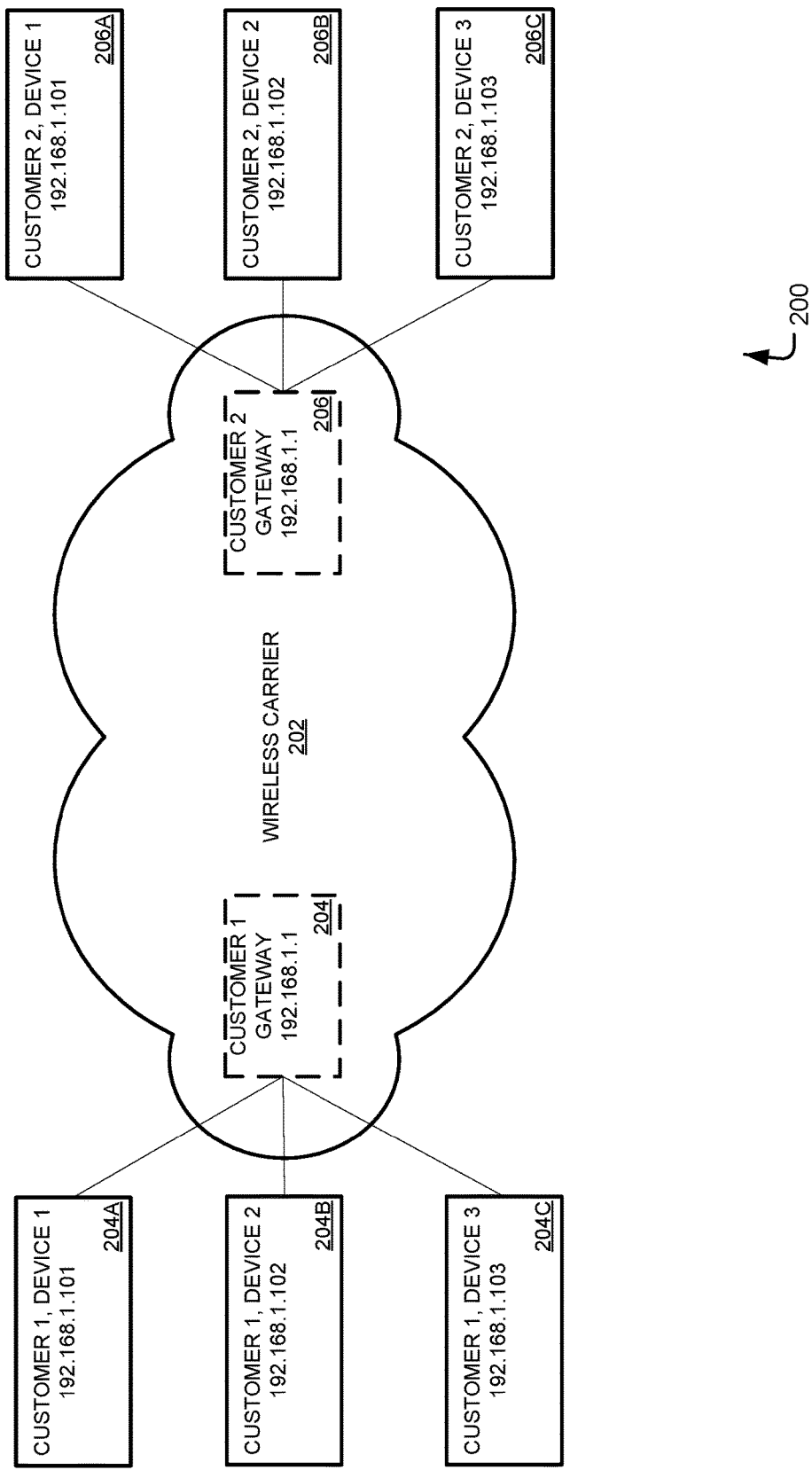
FIG. 2 illustrates an example system for implementing a cloud-based private area network that employs NAT techniques, as described herein.
Figure 3:
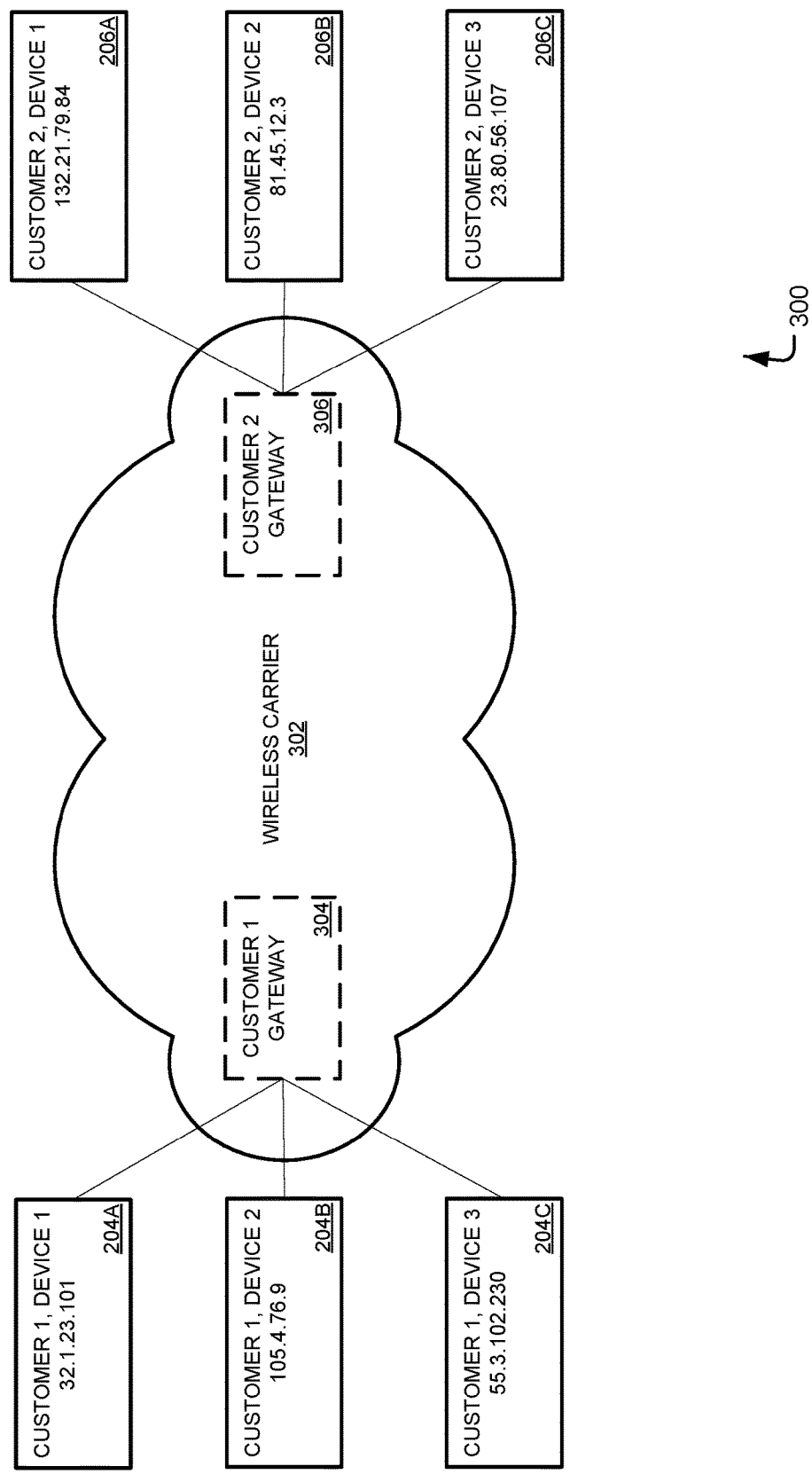
FIG. 3 illustrates an alternate example system for implementing a cloud-based private area network using IPv4, as described herein.
Figure 4:
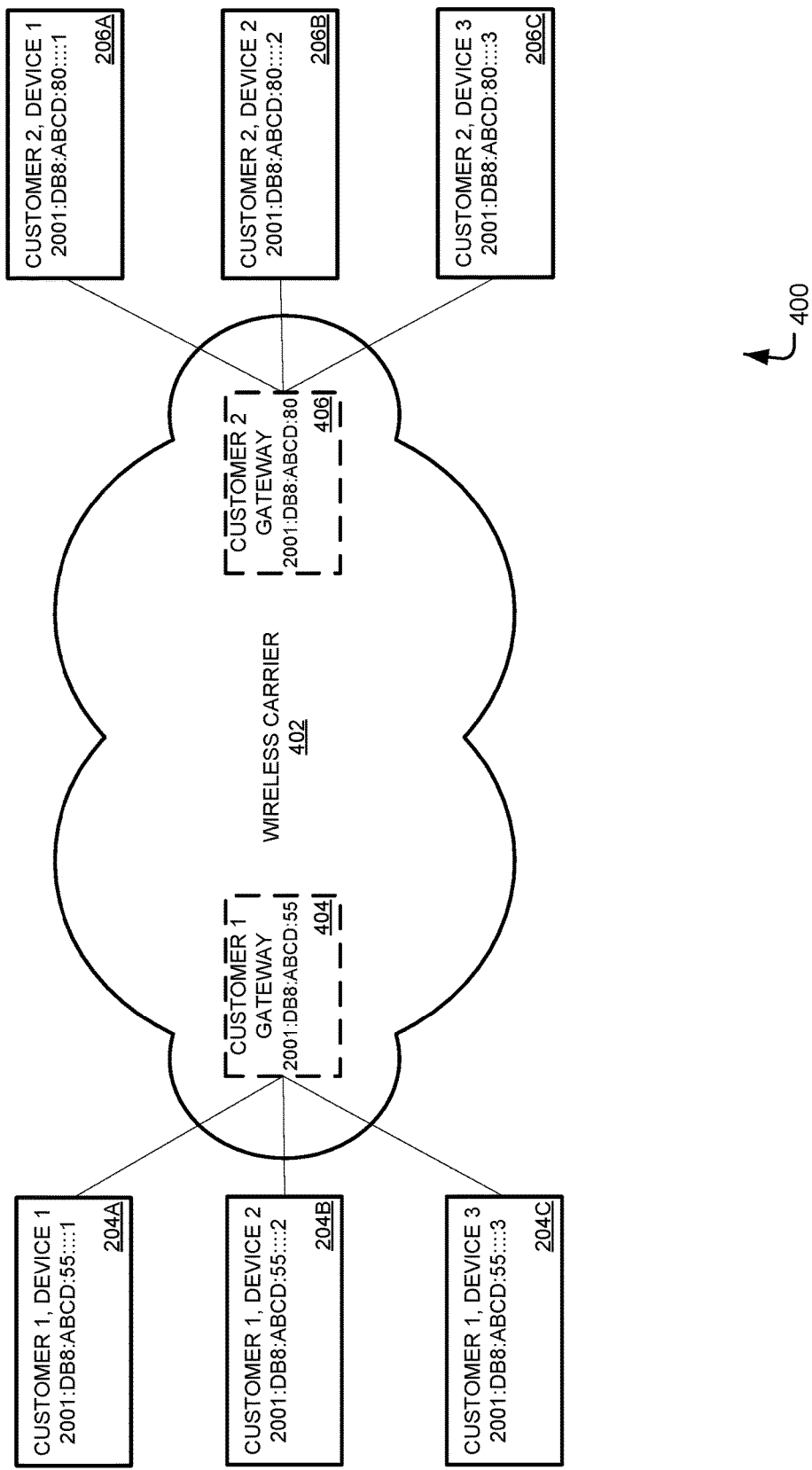
FIG. 4 illustrates an alternate example system for implementing a cloud-based private area network using IPv6, as described herein.

FIGS. 2-4 illustrate example overviews of systems for implementing a cloud-based private area network as described herein. Exemplary systems 200-400 as presented are each a combination of interdependent components that interact to form an integrated whole for implementing user-specific and/or user account-specific "cloud" (e.g., cloud-based) gateways in network operator environments. Components of the systems may be hardware components or software implemented on and/or executed by hardware components of the systems. In examples, systems 200-400 may include hardware components (e.g., used to execute/run an operating system (OS)), and software components (e.g., applications, application programming interfaces (APIs), modules, virtual machines, runtime libraries, etc.) running on hardware. In one example, systems 200-400 100 may provide an environment in which components execute, obey operational constraints set, and utilize resources or facilities of systems 200-400. In such an example, the components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the exemplary operating environments depicted in FIG. 7. In other examples, the components of systems disclosed herein may be spread across multiple devices. For instance, input may be entered on a client device and information may be processed or accessed from other devices in a network, such as one or more server devices.

System 200 illustrates an overview of an example system for implementing a cloud-based private area network that employs NAT techniques. System 200 comprises wireless carrier 202, customer 1 gateway 204, customer devices 204A, 204B, and 204C, customer 2 gateway 206, and customer devices 206A, 206B, and 206C. Wireless carrier 202 represents a mobile network operator that provides wireless communications services to subscribed customers. In examples, wireless carrier 202 may be configured to implement various network technologies, such as 3G, 4G, 4G LTE, 5G, etc., and to be compliant with multiple internet protocol versions, such as IPv4 and IPv6. Although carrier 202 is specifically referred to herein as a wireless carrier, alternate carrier types (e.g., wired communications carriers) are contemplated. In aspects, wireless carrier 202 may provide one or more networks configured to support connections by one or more customer devices, such as customer devices 204A, 204B, 204C, 206A, 206B, and 206C. Customer devices 204A, 204B, and 204C represent devices associated with a first customer (i.e. CUSTOMER 1) or first customer account, and customer devices 206A, 206B, and 206C represent devices associated with a second customer (i.e. CUSTOMER 2) or a second customer account. Examples of customer devices may include a desktop computer, a laptop computer, a mobile phone, a personal digital assistant, a tablet computer, a television, a satellite and/or cable set-top box, a video processing device, or the like. In examples, the customer devices connecting to wireless carrier 202 may require minimal or no special client configuration to access or utilize a private area network provided by wireless carrier 202. Instead, because most (if not all) of the cloud-based private area network techniques may be performed by the wireless carrier, any customer device capable of accessing wireless carrier 202 may have access to private area networks provided by wireless carrier 202.

Wireless carrier 202 may be further configured to access information associated with connected customer devices. In aspects, wireless carrier 202 may comprise or have access to a system, service, or utility for identifying and/or aggregating information for customer devices that have connected to a public network of wireless carrier 202. Such information may include, for example, user/customer information, user/customer account information, authentication/authorization information, device information, network information, and behavioral data. In examples, the information may be aggregated from various sources, such as user account systems or data, system and application event data, user identification data, user profile data, user preference settings, device manifests, device identification data, network appliance data, authentication systems and data, authorization data and objects, and request messages for user supplied data. The sources may be stored locally by wireless carrier 202, accessed remotely by wireless carrier 202, or a combination thereof.

Wireless carrier 202 may process the information to identify and/or generate associations between one or more customer devices. In examples, identifying/generating the associations may include applying machine learning techniques, pattern matching techniques, a fuzzy logic algorithm, one or more rule sets, and/or a mapping utility to the information. Alternately, wireless carrier 202 may provide the information to a separate data processing system or service to identify and/or generate associations between one or more customer devices. After associations between customer devices have been identified and/or received, wireless carrier 202 may arrange associated devices into one or more logical groups based on the identified associations. For example, customer devices that are determined to be on the same user account may be arranged in a logical group according to user account, and/or an indication of the association may be recorded accordingly. In at least one example, the indications of association may be stored as a device mapping that maps customer devices to other customer devices, users, and/or user accounts.

Wireless carrier 202 may be further configured to provide, or make accessible, one or more customer cloud-based gateways via a network or service provided by wireless carrier 202. In aspects, wireless carrier 202 may comprise or have access to a service or utility for generating, providing, and/or maintaining customer-specific or account-specific gateways, such as customer 1 gateway 204 and customer 2 gateway 206. Customer gateways may be physical devices that are physically allocated by the wireless carriers (or by agents thereof), or virtual devices that are generated and maintained by software installed on (or associated with) wireless carrier 202. In examples, wireless carrier 202 may assign individual customer gateways to groups of devices that have been identified as associated. For example, a customer gateway may be assigned to a grouping of customer devices that are determined to be on the same user account or related to the same user. In aspects, a customer gateway may be configured to create and/or provide a private area network (PAN) for the grouped customer devices. When the grouped customer devices connect to the PAN, the PAN may enable the grouped customer devices to discover, trust (to at least some extent), and securely communicate with each other. The customer gateway may additionally provide functionality typically found in home (e.g., private and/or personal/residential) gateways. Such functionality may include, for example, DHCP assignment of IP addresses, NAT, DNS functions, port forwarding and/or blocking, firewall functions, access policy control, IP address and MAC address binding, broadcast message delivery to grouped customer devices, network and device usage statistics, and an interface for configuring the customer gateway and/or interfacing with one or more grouped customer devices.

In aspects, wireless carrier 202 may provide the above-described functionality (e.g., functionality typically found in home gateways) by incorporating or accessing one or more local or remote systems and/or services. As a specific example, in FIG. 2, wireless carrier 202 comprises a local NAT service (not pictured) that is operable to be used by customer 1 gateway 204 and customer 2 gateway 206. The NAT service enables the same subnet (e.g., 192.168.1.1) to be assigned to customer 1 gateway 204 and customer 2 gateway 206. After a subnet has been assigned to a customer gateway, the customer gateway may allocate private IP addresses from the subnet to each of the customer device. For instance, customer device 204A is allocated IP address 192.168.1.101, customer device 204B is allocated IP address 192.168.1.102, and customer device 204C is allocated IP address 192.168.1.103. As shown, the NAT service enables private IP addresses currently allocated by one customer gateway to be concurrently allocated by a second customer gateway. For instance, customer device 206A is allocated IP address 192.168.1.101, customer device 206B is allocated IP address 192.168.1.102, and customer device 206C is allocated IP address 192.168.1.103. In aspects, when a customer device attempts to communicate with another device, the customer gateway provides the NAT functionality.

System 300 illustrates an overview of an alternate example system for implementing a cloud-based private area network using IPv4. System 300 comprises wireless carrier 302, customer 1 gateway 304, customer devices 204A, 204B, and 204C, customer 2 gateway 306, and customer devices 206A, 206B, and 206C. In aspects, wireless carrier 302 may be configured, and provide functionality, similarly to wireless carrier 202 described above. As a specific example, in FIG. 3, wireless carrier 302 has generated customer 1 gateway 304 and customer 2 gateway 306. In turn, customer 1 gateway 304 has provided a PAN for customer devices 204A, 204B, and 204C, and customer 2 gateway 306 has provided a PAN for customer devices 206A, 206B, and 206C. Neither customer 1 gateway 304 nor customer 2 gateway 306 is assigned a subnet or has access to NAT services. The customer devices connected to the respective PANs of customer 1 gateway 304 and customer 2 gateway 306 are each allocated a public IPv4 address. In examples, each of the customer devices may have a different default gateway IP address. In at least one example, the customer gateways may translate broadcast messages from devices connected to the PAN of the customer gateways into unicast messages. The customer gateways may facilitate the delivery of the unicast messages to one or more recipient devices.

System 400 illustrates an overview of an alternate example system for implementing a cloud-based private area network using IPv6. System 400 comprises wireless carrier 402, customer 1 gateway 404, customer devices 204A, 204B, and 204C, customer 2 gateway 406, and customer devices 206A, 206B, and 206C. In aspects, wireless carrier 402 may be configured, and provide functionality, similarly to wireless carriers 202. As a specific example, in FIG. 4, wireless carrier 402 has generated customer 1 gateway 404 and customer 2 gateway 406. In turn, customer 1 gateway 404 has provided a PAN for customer devices 204A, 204B, and 204C, and customer 2 gateway 406 has provided a PAN for customer devices 206A, 206B, and 206C. Neither customer 1 gateway 404 nor customer 2 gateway 406 has access to NAT services. Wireless carrier 402 has assigned subnet 2001:DB8:ABCD:55 to customer 1 gateway 404 and subnet 2001:DB8:ABCD:80 to customer 2 gateway 406. Customer 1 gateway 404 and customer 2 gateway 406 allocate publicly routable IPv6 addresses from their respective subnets to their respective connected customer devices. For instance, customer 1 gateway 404 allocates IPv6 address 2001:DB8:ABCD:55::::1 to device 204A, IPv6 address 2001:DB8:ABCD:55:::2 to device 204B, and IPv6 address 2001:DB8:ABCD:55::::3 to device 204C.

Figure 5:
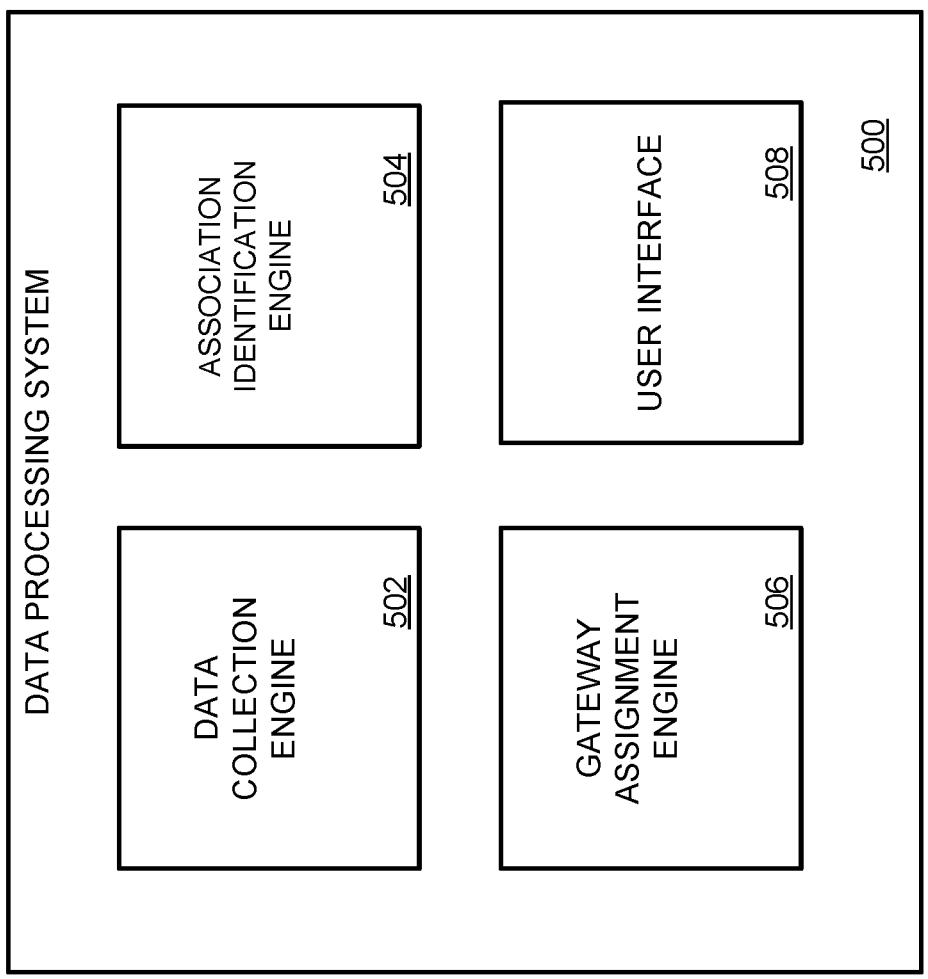
FIG. 5 illustrates an example data processing system for implementing a cloud-based private area network

FIG. 5 illustrates an overview of example data processing system 500 for implementing a cloud-based private area network, as described herein. The cloud-based private area network techniques implemented by data processing system 500 may comprise the functionality and techniques described in FIGS. 2-4. In alternative examples, a distributed system (comprising one or more components such as processor and/or memory) may perform processing described in data processing system 500.

With respect to FIG. 5, data processing system 500 may represent, for example, a network operator that provides communication and network services to customers/users. In aspects, data processing system 500 may comprise data collection engine 502, association identification engine 504, gateway assignment engine 506, and user interface 508. One of skill in the art will appreciate that the scale of systems such as data processing system 500 may vary and may include more or fewer components than those described in FIG. 5. In some examples, interfacing between components of data processing system 500 may occur locally, such as where components of data processing system 500 are within the same device or network (e.g., WAN, LAN, peer to peer network, etc.). In other examples, interfacing between components of the data processing system 500 may occur remotely, such as where components of data processing system 500 are spread across one or more devices of one or more distributed networks.

Data collection engine 502 may be configured to collect customer, account, and/or device information from one or more data sources. In aspects, data processing system 500 may detect, or otherwise be informed of, devices (e.g., customer devices, user devices, network appliance devices, etc.) that have connected to data processing system 500 or a network thereof. Data processing system 500 may collect and/or store information related to the detected/connected devices and/or the corresponding users. Data collection engine 502 may have access to the information collected/stored, and may collect or aggregate at least a portion of the collected/stored information. Alternately, data collection engine 502 may interrogate, or otherwise solicit data from, one or more data sources comprising such information. For example, data collection engine 502 may have access to data in one or more external systems, such as billing systems, customer care systems, provisioning systems, marketing systems, user profiles or preference settings, authentication/authorization systems, device manifests, or the like. Data collection engine 502 may use a set of APIs or similar interfaces to communicate requests to, and receive response data from, such data sources. In at least one example, the data collection process of data collection engine 502 may be triggered according to a preset schedule, in response to a specific user request to collect data, or in response to the satisfaction of one or more criteria Association identification engine 504 may be configured to generate or identify associations between one or more devices. In aspects, association identification engine 504 may have access to data collected by data collection engine 502. Association identification engine 504 may perform one or more processing operations on the collected data. The processing operations may include organizing the collected data into one or more groups and/or sorting the data according to one or more criteria. The processing operations may additionally include evaluating the collected data to determine associations and/or relationships between devices indicated in the collected data. In examples associations may be determined by applying machine learning techniques, pattern matching techniques, a fuzzy logic algorithm, one or more rule sets, an association model, a set of heuristics, and/or a mapping utility to the collected data. In some aspects, the determined associations may indicate, for instance, that two or more devices are related to the same user or user group, the same user account, or the same physical area or location. When associations between a set of devices are determined, association identification engine 504 may arrange the associated devices into one or more logical groups. A logical group may be organized according to various criteria, such as user, user account, physical location, or IP address range. Association identification engine 504 may also record an indication of the associations in, for instance, a mapping file or table. In at least one example, the recorded indications may be accessible to data collection engine 502 during the data collection process described above.

Gateway assignment engine 506 may be configured to generate and/or assign a gateway to an individual customer. In aspects, gateway assignment engine 506 may generate and/or assign one or more physical and/or logical customer gateways to a customer or customer account based on the satisfaction of one or more criteria. For example, gateway assignment engine 506 may generate a logical customer gateway (or an instance thereof) in response to an explicit user request, upon determining that at least one device is associated with a customer or customer account, or upon detecting that one or more devices have connected to a particular subnet or to an IP address in a specified range of IP addresses. Alternately, gateway assignment engine 506 may cause the assignment of a physical customer gateway to a customer. The physical customer gateway may be implemented in the environment of data processing system 500 or in the computing environment of the customer. Once a gateway has been assigned, the gateway may provide a PAN (or access to a PAN) for one or more devices that have been identified as associated. The gateway may enable devices connected to (or device that have previously connected to) a PAN to detect and communicate securely with each other. In some aspects, a gateway assigned by gateway assignment engine 506 may be configured to provide functionality typically found in home gateways (e.g., private, personal or residential gateways). Such functionality may include, for example, DHCP assignment of IP addresses, NAT, DNS functions, port forwarding and/or blocking, firewall functions, access policy control, IP address and MAC address binding, broadcast message delivery to grouped customer devices, network and device usage statistics, and an interface for configuring the customer gateway and/or interfacing with one or more grouped customer devices. For example, a customer gateway may have access to a policy server comprising one or more access policies. The policy server may be local to data processing system 500 or may be accessed remotely by data processing system 500. The customer gateway may interface with the policy server to retrieve a set of access policies that may be applied to one or more devices connected to the customer gateway. The customer gateway may store and enforce the applied access policies or may facilitate the enforcement of the applied access policies.

User interface 508 may be configured to provide access to one or more components of data processing system 500. In aspects, user interface 508 may provide for accessing, navigating, and/or configuring components (e.g., data collection engine 502, association identification engine 504, and gateway assignment engine 506), objects (e.g., customer gateways, networks, access policy objects, etc.) and data relating to data processing system 500. For example, user interface 508 may provide an interface for configuring one or more customer gateways allocated to a customer. In such an example, configuring a customer gateway may comprise, for instance, associating a device with (or disassociating a device from) the customer gateway, generating or configuring a PAN or LAN, specifying a gateway subnet, adding or removing devices from the subnet, adding or modifying device groups, applying or modifying access policies, or modifying DCHP or DNS settings.

Figure 6:
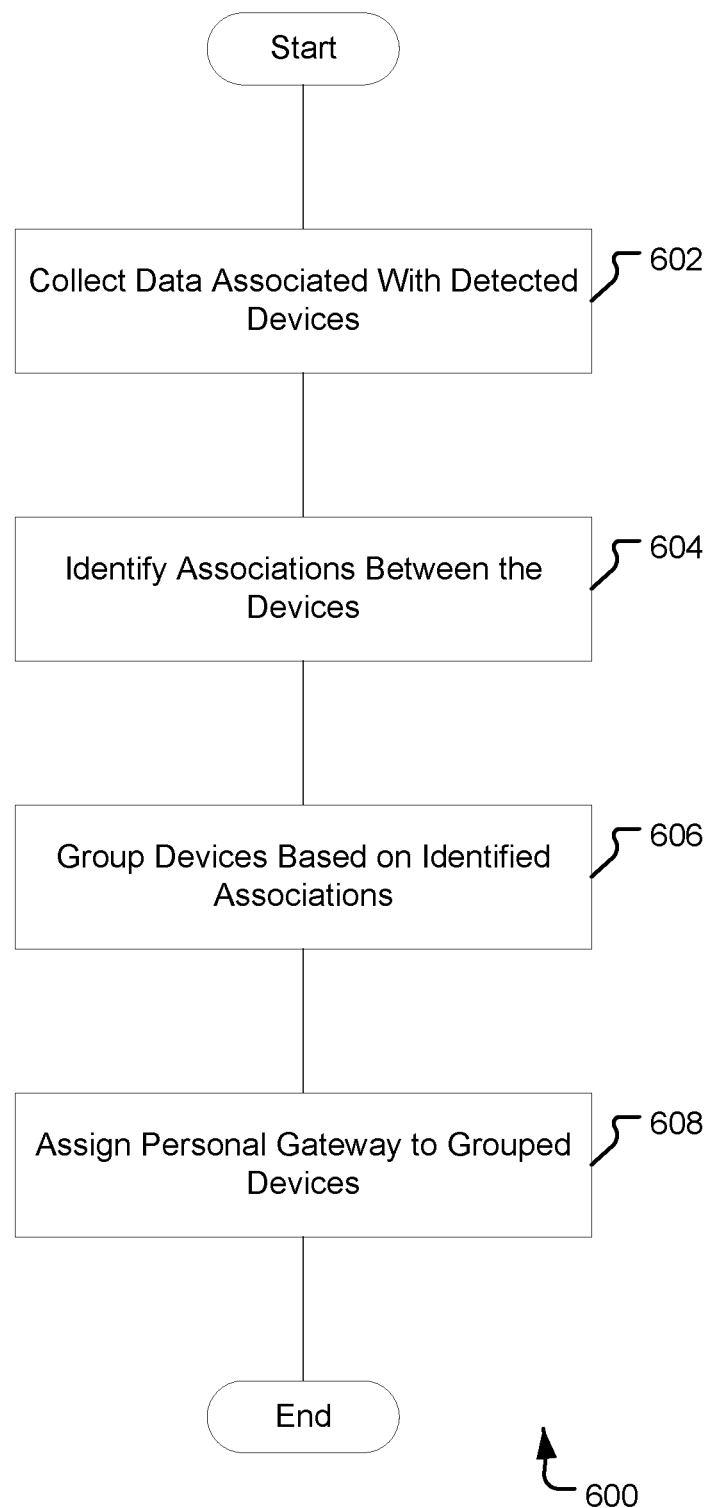
FIG. 6 illustrates an example method for implementing a cloud-based private area network, as described herein.

FIG. 6 illustrates an example method for implementing a cloud-based private area network, as described herein. In aspects, method 600 may be executed by various systems, such as systems 200-500 of FIGS. 2-5, and may be executed on one or more devices comprising at least one processor configured to store and execute operations, programs, and/or instructions. However, method 600 is not limited to such examples. In other examples, method 600 may be performed by an application or service for implementing a cloud-based private area network. In at least one aspect, method 600 may be executed (e.g., computer-implemented operations) by one or more components of a distributed network, such as a web service or a distributed network service (e.g. cloud service).

Exemplary method 600 begins at operation 602 where data associated with detected devices is collected. In aspects, a network operator system, such as data processing system 500, may provide communication and network services to customers and/or users. The network operator system may store, or provide access to, information related to customer devices that are (or have previously been) detected by, or connected to, the network operator system. Such information may include, for example, customer account information (e.g., customer account number/identifier, customer name, contact information, registered devices, account activity information, etc.), billing information (e.g., billing address, payment information, billing statements, etc.), device information (e.g., IP address, MAC address, international mobile subscriber identity (IMSI), device name, etc.), and behavioral data (e.g., login/logout events, search history, detected networks, device geolocation, usage patterns, purchase history, etc.). The network operator system may comprise, or have access to, a data collection mechanism for accessing and/or collecting the information, such as data collection engine 502. The data collection mechanism may search and collect at least a subset of data from the information stored by the network operator system. In some aspects, the data collection mechanism may additionally search and collect data not stored by the network operator system. For example, the data collection mechanism may interrogate (or otherwise solicit data from) external data sources, such as billing systems, customer care systems, provisioning systems, marketing systems, user profiles or preference settings, authentication/authorization systems, device manifests, or the like. Interrogating external data sources may comprise transmitting data requests directly to the data sources, or submitting the data requests to an external data collection service/system. The external data collection service/system may transmit the data request(s) to one or more data sources and return the response data from the data sources to the data collection mechanism of the network operator system. In some examples, the data collection mechanism may store the data collected from the customer device-related information in one or more storage locations accessible to the network operator system.

At operation 604, associations between one or more customer devices are identified. In aspects, an association identification mechanism, such as association identification engine 606, may have access to the data collected by the data collection mechanism. For example, the collected data may be provided to the association identification mechanism as part of the data collection process. Alternately, the collected data may be provided to the association identification mechanism according to a predefined schedule, in response to a user request to determine associations between devices, or in response to the satisfaction of one or more criteria. As a specific example, an association identification process may be executed anytime a new customer device is registered on, detected by, or attempts to connect to the network operator system. In aspects, upon accessing the collected data, the association identification mechanism may perform one or more processing operations on the collected data. The processing operations may include evaluating the collected data to determine associations and/or relationships between one or more of the devices indicated in the collected data. Determining associations/relationships between devices may comprise applying machine learning techniques, pattern matching techniques, a fuzzy logic algorithm, one or more rule sets, an association model, a set of heuristics, and/or a mapping utility to the collected data. For example, a fuzzy logic algorithm may be applied to a set of collected data. The algorithm may be used to determine that two or more user accounts (e.g., "TigerWoods1975" and "Tiger_Woods") sharing one or more similarities (e.g., sematic similarities, a common customer, similar browsing activity, etc.) are owned by the same user. Accordingly, the two user accounts may be indicated as associated. As another example, a machine learning model may be applied to a set of collected data. The model may determine that two devices named "Serena W's phone" and "Serena W's tablet" typically connect to the network operator system from approximately the same geolocation. The model may additionally determine that the two devices frequently access the same websites, are not active concurrently, and post to the same social media account(s). Based at least on this information, the model may determine that the two devices belong to the same user. Accordingly, the two devices may be indicated as associated.

At operation 606, associated customer devices may be arranged into one or more groups. In some aspects, the processing operations of the association identification mechanism may additionally include organizing the collected data into one or more logical groups and/or sorting the collected data according to one or more criteria. For example, the association identification mechanism may have access to an entity mapping service. The entity mapping service may be used to determine the user account associated with each customer device identified in a set of collected data. The identified customer devices may be arranged into logical groups according to user account, and the logical groupings may be named and/or recorded in a mapping file. The mapping file may include, for example, a logical grouping identifier, a grouping criteria (e.g., user account), device identification information, detection time/dates, and the manner in which the devices are associated. As a specific example, continuing from the above example, the association identification mechanism may search the collected data to identify the customer devices that are associated with the account names "TigerWoods1975" or "Tiger_Woods." The customer device(s) identified as associated with these accounts may be arranged into a logical group. In examples, a logical group may comprise zero or more devices. The association identification mechanism may create a generic name for the logical group of devices (e.g., "Customer 'X' Group 1") or may create a user-specific or account-specific name for the logical group of devices (e.g., "Tiger Woods devices"). The association identification mechanism may additionally (or alternately) record information relating to the logical group of devices in a device association table. In examples, the association identification mechanism may create a separate device association table for each customer or customer account, or the association data for multiple customers may be stored in the same device association table. The device association table may be updated or recreated when the association identification process is executed. In some examples, the device association table may be used as a data source during the during the data collection process of operation 602.

At operation 608, a customer gateway may be assigned to a logical group of devices. In aspects, a personal gateway creation and/or assignment mechanism, such as gateway assignment engine 506, may have access to information relating to, or describing, one or more groups of customer devices. The personal gateway creation/assignment mechanism may create and/or assign one or more physical and/or logical customer gateways to a customer or customer account based on the information relating to the groups of customer devices. For example, a customer gateway may be assigned to a customer having multiple customer accounts on the network operator system. The assigned customer gateway may be configured to provide individual PANs for one or more of the customer accounts, or for one or more groups of customer devices on one or more of the customer accounts. Alternately, a separate customer gateway may be assigned to each customer account of a customer, or to each group of customer devices on one or more customer accounts of a customer. In such an example, the customer gateway(s) may be configured to provide individual PANs for each customer account or each group of customer devices. In aspects, once a customer gateway has been assigned, the customer gateway may enable devices in a logical group of devices to detect and communicate securely with each other over a PAN provided by the customer gateway. The customer gateway may also ensure at least a minimum level of trustworthiness between the logical group of devices. In some of these aspects, one or more of the customer gateways may provide additional functionality, such as DHCP assignment of IP addresses, NAT, DNS functions, port forwarding and/or blocking, firewall functions, access policy control, IP address and MAC address binding, broadcast message delivery to grouped customer devices, network and device usage statistics, and an interface for configuring the customer gateway and/or interfacing with one or more customer devices. For example, customer "Mike T" has a user account on which two customer devices are registered with the network operator system (e.g., a mobile phone at the customer's Anaheim residence and a shared network printer at the customer's vacation home in Vail). After determining that the two customer devices are registered to the same account (using one or more of the processes described above), a customer gateway is assigned to the customer account. The assigned customer gateway provides a PAN enabling private subnet addresses to be assigned and maintained. The PAN enables the two customer devices to detect and securely communicate with each other using the subnet. The customer gateway additionally provides firewalling for the two devices and a user interface for configuring the customer gateway. The user interface enables customer "Mike T" to add additional customer devices to the PAN and to configure policy access rules for the customer devices.

Figure 7:
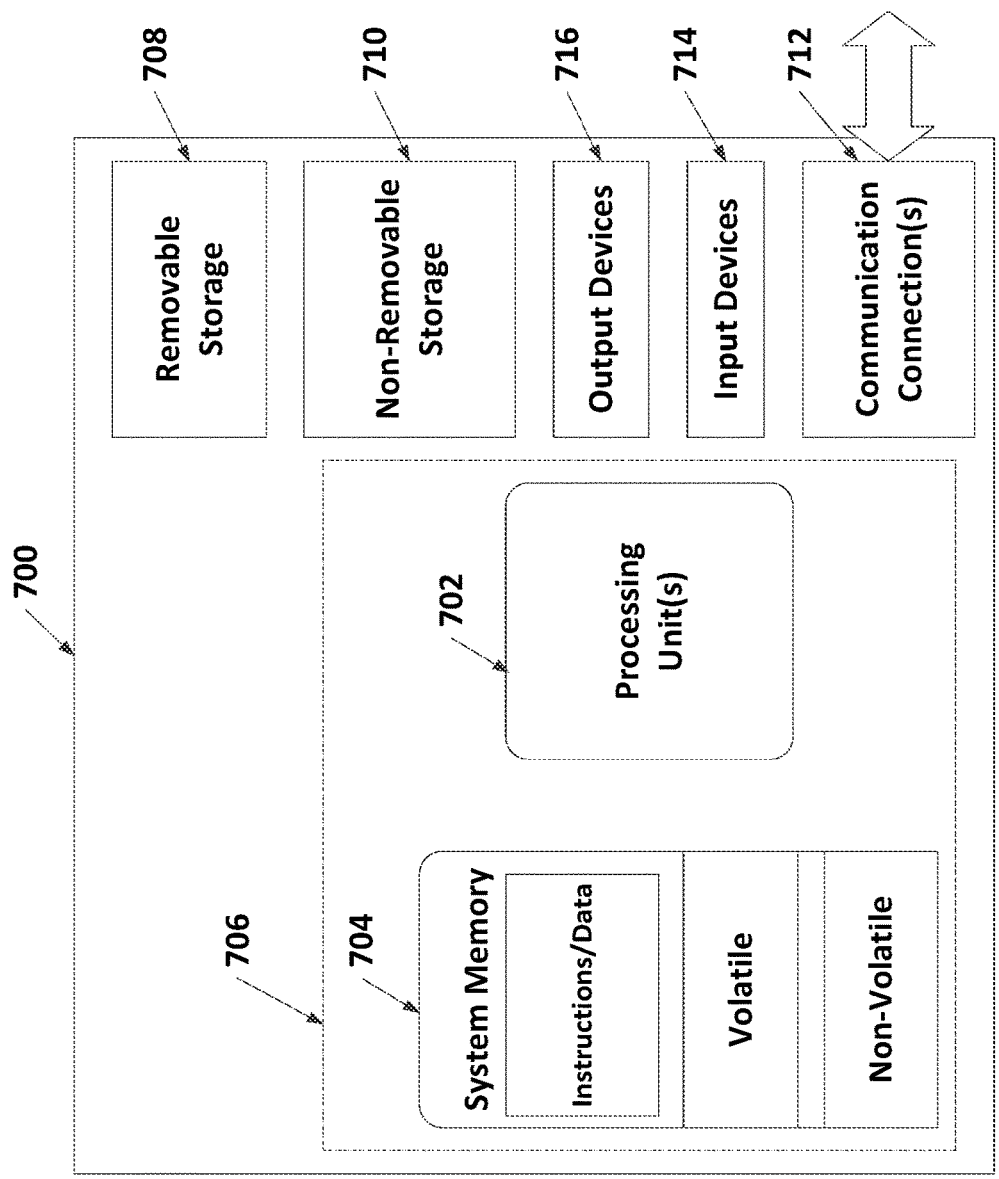
FIG. 7 illustrates one example of a suitable operating environment in which one or more of the present embodiments may be implemented.

FIG. 7 illustrates one example of a suitable operating environment 700 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable, 708, and/or non-removable, 710) including, but not limited to, magnetic or optical disks or tape. Similarly, environment 700 may also have input device(s) 714 such as keyboard, mouse, pen, voice input, etc. and/or output device(s) 716 such as a display, speakers, printer, etc. Also included in the environment may be one or more communication connections, 712, such as LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory coupled to the at least one processor, the memory comprising computer executable instructions that, when executed by the at least one processor, performs a method comprising:
    collecting data relating to two or more devices detected by a mobile network operator;
    identifying an association between the two or more devices, wherein the association indicates the two or more devices share a common user;
    grouping the two or more devices into a device group based on the identified association;
    assigning one or more personal gateways to the device group, wherein the one or more personal gateways are operated by the mobile network operator, wherein the one or more personal gateways establish a private area network and enabling a private subnet for the two or more devices in the device group, the private area network allowing devices in the device group to detect each other and send direct communications between the two or more devices via the private subnet; and
    providing a user interface, wherein the user interface is operable to receive instructions from the common user to associate a new device or disassociate an existing device from one or more personal gateways and from the private area network.

2. The system of claim 1, wherein the data comprises at least one of account information, billing information, device information, or behavioral data.

3. The system of claim 1, wherein at least a portion of the data is collected from a data source external to the mobile network operator.

4. The system of claim 1, wherein identifying the association between the two or more devices comprises applying to the data at least one of machine learning techniques, pattern matching techniques, a fuzzy logic algorithm, one or more rule sets, an association model, a set of heuristics, or entity mapping techniques.

5. The system of claim 1, wherein grouping the two or more devices comprises recording at least the two or more devices and the identified association in a storage location.

6. The system of claim 1, wherein assigning the one or more personal gateways comprise generating, by the mobile network operator, at least one logical gateway.

7. The system of claim 1, wherein the one or more personal gateways further provide at least one of DHCP assignment of IP addresses, NAT, DNS functions, port forwarding, or port blocking.

8. The system of claim 1, wherein the one or more personal gateways further provide at least one of IP address binding, MAC address binding, broadcast message delivery to the device group, or an interface for configuring the one or more personal gateways.

9. The system of claim 1, wherein each of the one or more personal gateways is assigned the private subnet, and wherein the each of the two or more devices in the device group are assigned a private IP address on the private subnet.

10. The system of claim 1, wherein the one or more personal gateways provide access control for the two or more devices in the device group, wherein the access control is defined using one or more access policies stored by the mobile network operator.

11. The system of claim 1, wherein the one or more private area networks allows the devices in the device group to communicate via unicast messages.

12. A method comprising:
    collecting data relating to one or more devices that have connected to a mobile network operator;
    identifying an association between the one or more devices, wherein the association indicates the one or more devices are associated with a common user;
    grouping at least a portion of the one or more devices into a device group based on the identified association;
    assigning a personal gateway to the device group, wherein the personal gateway is controlled by the mobile network operator, wherein the personal gateways establish a private area network and enable a private subnet for the two or more devices in the device group, the private area network allowing devices in the device group to detect each other and send direct communications between the two or more devices via the private subnet; and
    providing a user interface, wherein the user interface is operable to receive instructions from the common user to associate a new device or disassociate an existing device from one or more personal gateways and from the private area network.

13. The method of claim 12, wherein the data comprises at least one of account information, authorization information, or authentication information.

14. The method of claim 12, wherein the common user associated with the one or more devices is further associated with a plurality of user accounts, wherein at least one of the one or more devices is registered to each of the plurality of user accounts.

15. The method of claim 14, wherein a separate device group is created for each of the plurality of user accounts, and wherein a separate personal gateway is assigned to each separate device group.

16. The method of claim 12, wherein at least a portion of the data is collected from one or more data sources external to the mobile network operator, wherein the one or more data sources comprise at least one of a billing system, a customer care system, a provisioning system, a marketing system, or a user profile.

17. The method of claim 12, wherein grouping the one or more devices comprises recording an indication of the identified association in a storage location, and ordering the one or more devices according to the identified association.

18. The method of claim 12, wherein the private area network allows the devices in the device group to communicate via unicast messages.

19. A non-transitory computer storage media storing computer executable instructions that when executed cause a computing system to perform a method comprising:
   collecting data relating to one or more devices that have connected to a mobile network operator;
   identifying an association between the one or more devices, wherein the association indicates the one or more devices are associated with a common user;
   grouping at least a portion of the one or more devices into a device group based on the identified association;
   assigning a personal gateway to the device group, wherein the personal gateway is controlled by the mobile network operator, wherein the personal gateways establish a private area network and enable a private subnet for the two or more devices in the device group, the private area network allowing devices in the device group to detect each other and send direct communications between the two or more devices via the private subnet; and
   providing a user interface, wherein the user interface is operable to receive instructions from the common user to associate a new device or disassociate an existing device from one or more personal gateways and from the private area network.

20. The non-transitory computer storage media of claim 19, wherein the private area network allows the devices in the device group to communicate via unicast messages.

\* \* \* \* \*